UNITED STATES PATENT OFFICE.

HENRI TERRISSE AND GEORGES DARIER, OF GENEVA, SWITZERLAND, ASSIGNORS TO THE BADISCHE ANILIN AND SODA FABRIK, OF LUDWIGSHAFEN, GERMANY.

YELLOW BASIC DYE.

SPECIFICATION forming part of Letters Patent No. 637,183, dated November 14, 1899.

Application filed August 19, 1899. Serial No. 727,847. (Specimens.)

*To all whom it may concern:*

Be it known that we, HENRI TERRISSE and GEORGES DARIER, citizens of the Swiss Republic, residing at Geneva, in the canton of Geneva and Republic of Switzerland, have invented new and useful Improvements in the Manufacture of Yellow Basic Coloring-Matters, of which the following is a specification.

We have invented a new yellow basic coloring-matter suitable for dyeing cotton mordanted with tannin and tartar emetic and also for dyeing leather.

We obtain our coloring-matter from the new reaction product first obtained by us from meta-toluylene-diamin and one molecular proportion of formaldehyde by mixing these bodies together in aqueous solution at the ordinary temperature. This new reaction product probably possesses the constitution represented by formula $C_6H_2NH_2NH_2CH_2OH$ $CH_3$ 1.3.4.6. Upon this view of its constitution it may be called "diamido-toluyl-alcohol." We treat it with beta-naphthylamin and beta-naphthylamin-hydrochlorate at a high temperature to obtain our new coloring-matter.

The following example will serve to illustrate the manner in which our invention is carried into practical effect and our new coloring-matter obtained. The parts are by weight.

Example: Melt about seventy (70) parts of beta-naphthylamin by heating to a temperature of 150° centigrade. To this add a mixture of fifteen (15) parts of diamido-toluyl-alcohol and thirty (30) parts of the hydrochlorate of beta-naphthylamin. Raise the temperature while stirring to 170° centigrade and maintain at this temperature for from one and one-half to two and one-half hours. Then extract the melt with about twelve hundred and fifty (1,250) parts of boiling water, filter hot, and allow to cool. Then filter again, whereby beta-naphthylamin-hydrochlorate, which separates out, is removed. Precipitate the coloring-matter base from the solution thus obtained by rendering it alkaline with carbonate of soda. Collect the base by filtering, and purify by recrystallization from toluene. Convert the purified base into its hydrochloric-acid salt in the usual way.

Our new coloring-matter in the form of a powder possesses a brown-red color. It is soluble in water, giving a brown-red solution. From its aqueous solution it can be readily precipitated by the addition of caustic soda, ammonia, or sodium carbonate, giving a yellow precipitate. On treatment with nitrous acid it yields a dark-brown colored diazo compound. If sodium chlorid be added to the aqueous solution of our new coloring-matter, it is readily precipitated, and on adding a little hydrochloric acid the precipitate remains. It is soluble in alcohol, giving a yellow solution with strong green fluorescence.

What we claim is—

As a new article of manufacture a new yellow basic coloring-matter which can be obtained from diamido-toluyl-alcohol, beta-naphthylamin, and beta-naphthylamin-hydrochlorate, which is soluble in water, and on treatment with nitrous acid gives a dark-brown-colored diazo compound, and which is precipitated from its aqueous solution by common salt, and not redissolved by the addition of a little hydrochloric acid, and which yields a yellow solution in alcohol possessing a green fluorescence, substantially as described.

In testimony whereof we have hereunto set our hands in the presence of two subscribing witnesses.

HENRI TERRISSE.
GEORGES DARIER.

Witnesses:
BENJ. H. RIDGELY,
L. H. MUNIER.